(12) United States Patent
Shinohara et al.

(10) Patent No.: US 9,817,555 B2
(45) Date of Patent: Nov. 14, 2017

(54) INFORMATION PROCESSING DEVICE AND INFORMATION PROCESSING METHOD

(71) Applicant: Sony Computer Entertainment Inc., Tokyo (JP)

(72) Inventors: Takayuki Shinohara, Tokyo (JP); Hidehiko Morisada, Tokyo (JP); Tomo Matayoshi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 315 days.

(21) Appl. No.: 14/633,398

(22) Filed: Feb. 27, 2015

(65) Prior Publication Data

US 2015/0268806 A1 Sep. 24, 2015

(30) Foreign Application Priority Data

Mar. 20, 2014 (JP) .................................. 2014-058731

(51) Int. Cl.
*G06F 3/048* (2013.01)
*G06F 3/0483* (2013.01)
(Continued)

(52) U.S. Cl.
CPC ............ *G06F 3/0483* (2013.01); *G06F 3/023* (2013.01); *G06F 3/04855* (2013.01); *G06F 3/04883* (2013.01)

(58) Field of Classification Search
CPC .................................................. G06F 3/0483
(Continued)

(56) References Cited

U.S. PATENT DOCUMENTS 7,558,820 B2 7/2009 Kimoto et al.
2012/0042279 A1* 2/2012 Naderi ................ G06F 3/04855
715/786
(Continued)

FOREIGN PATENT DOCUMENTS

JP 2001-184153 7/2001
JP 2004-21467 1/2004
(Continued)

OTHER PUBLICATIONS

Japanese Notification of Reasons for Refusal dated Mar. 15, 2016 from corresponding Application No. 2014-058731.

*Primary Examiner* — William Titcomb
(74) *Attorney, Agent, or Firm* — Katten Muchin Rosenman LLP

(57) ABSTRACT

Disclosed herein is an information processing device for displaying contents formed by a plurality of pages according to user operation. The information processing device includes: an operation receiving section receiving an operation of changing a page as an object of display; and a display image control section displaying a slide bar displaying a handle indicating a position of the displayed page on a bar representing the pages of a whole of the contents as a GUI on a display device with an image of the page being displayed. When the operation receiving section receives a user operation of sliding the handle, the display image control section changes display to a page corresponding to a handle reached position. When the operation receiving section receives a user operation on predetermined operating means of an input device, the display image control section changes display to a page serving as a predetermined break.

8 Claims, 11 Drawing Sheets

(51) Int. Cl.
*G06F 3/0485* (2013.01)
*G06F 3/023* (2006.01)
*G06F 3/0488* (2013.01)

(58) Field of Classification Search
USPC .......................................................... 715/771
See application file for complete search history.

(56) References Cited

U.S. PATENT DOCUMENTS

2012/0192102 A1    7/2012  Migos et al.
2015/0212723 A1*  7/2015  Lim .......................... G06F 3/14
                                                   715/760

FOREIGN PATENT DOCUMENTS

JP         2013-101618     5/2013
JP         2013-137614     7/2013

\* cited by examiner

10

10

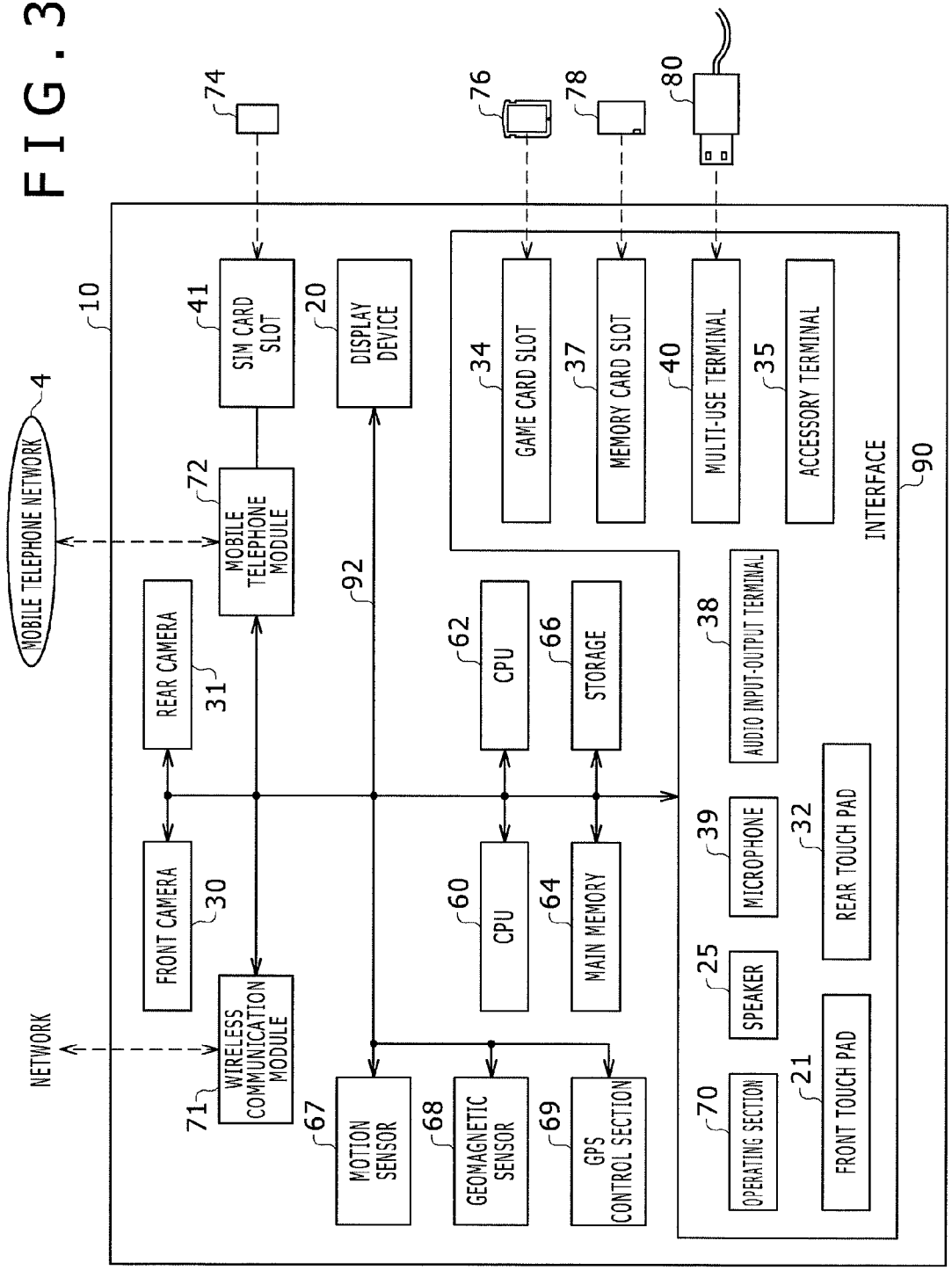

F I G. 4
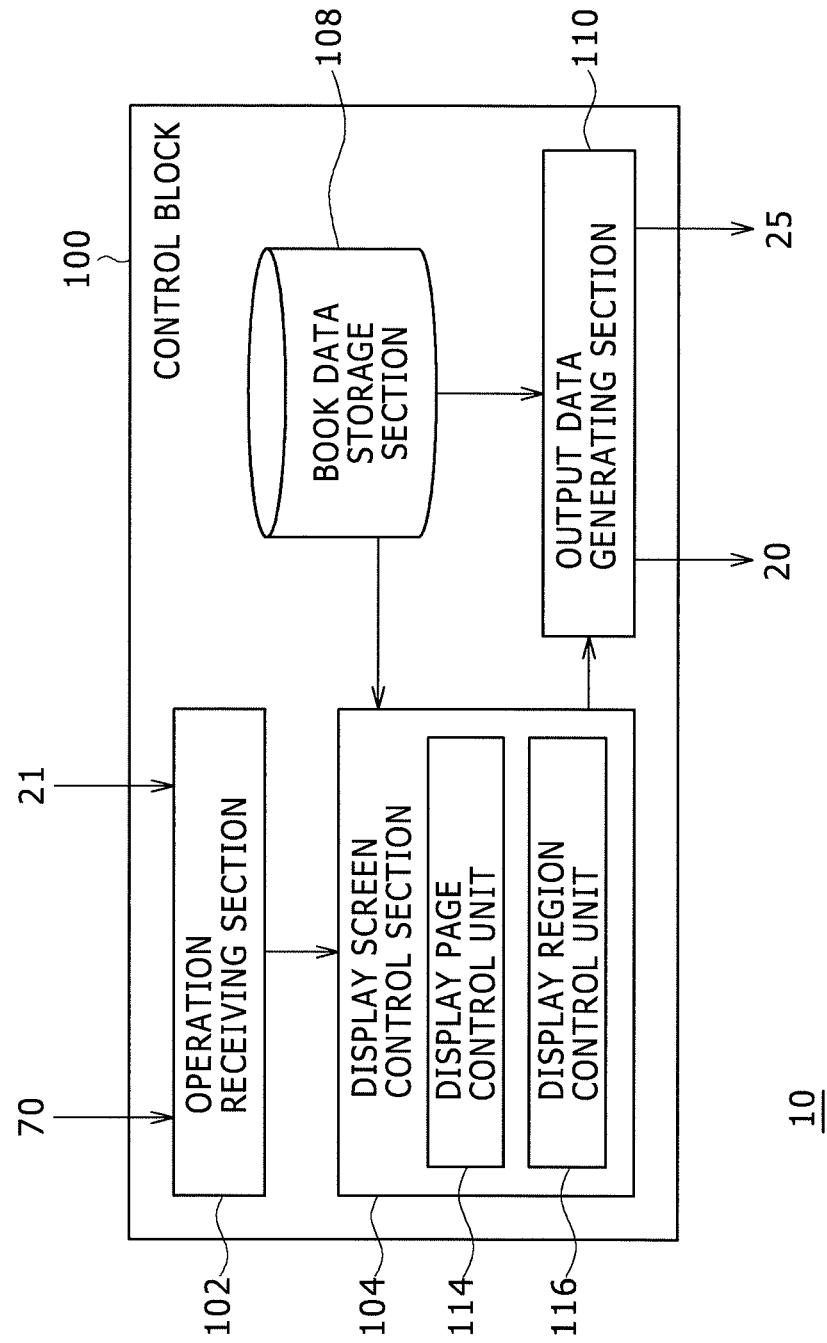

| IDENTIFICATION NUMBER 154 | PAGE 156 | POSITION 158 |
|---|---|---|
| 1 | 1 | (10,10) |
| 2 | 3 | (10,10) |
| 3 | 20 | (10,10) |
| 4 | 20 | (0,150) |
| 5 | 20 | (150,400) |
| ... | ... | ... |

153

INFORMATION PROCESSING DEVICE AND INFORMATION PROCESSING METHOD

BACKGROUND

The present disclosure relates to an information processing device that controls display screen according to a manual operating input by a user, an information processing method, and a computer readable recording medium.

Information processing devices such as portable type game machines, PDAs (Personal Digital Assistants), and the like have spread. Recently, many information processing devices have been equipped with a communicating function, and multifunctional type information processing devices into which functions of a mobile telephone, a PDA, and the like are integrated into one, such as smart phones, have also appeared. Such an information processing device includes a high-capacity memory and a high-speed processor, so that a user can enjoy various applications by installing application programs (see for example U.S. Pat. No. 7,558,820).

Because such an environment is provided, various kinds of contents such as electronic books, moving images including video and the like, Web pages, music, and the like are obtained via a network or a recording medium and personally enjoyed on an information processing device on a daily basis. In addition, viewing with high image quality has become possible irrespective of the size of the device such as a personal computer, a portable terminal, or the like. An image processing technology has thus become indispensable in daily life.

SUMMARY

In a case of viewing contents including many pieces of character information and image information over a large number of pages as in an electronic book, rules for movement between pages and a viewing direction within a page, for example, are unique. Thus, as compared with a case where a Web page is simply displayed, for example, contrivance is necessary for a display method and an operating method. A technology is desired which makes it possible to view contents with a feeling close to that of actually reading a book and with natural operations even when using an information processing device.

The present disclosure has been made in view of such problems. It is an object of the present disclosure to provide a technology that can display contents with excellent operability.

A mode of the present disclosure relates to an information processing device. The information processing device is an information processing device for displaying contents formed by a plurality of pages according to user operation. The information processing device includes: an operation receiving section receiving an operation of changing a page as an object of display; and a display image control section displaying a slide bar displaying a handle indicating a position of the page being displayed on a bar representing the pages of a whole of the contents as a graphical user interface (GUI) on a display device together with an image of the page being displayed. When the operation receiving section receives a user operation of sliding the handle on the slide bar, the display image control section changes display to a page corresponding to a reached position of the handle. When the operation receiving section receives a user operation on predetermined operating means of an input device, the display image control section changes display to a page serving as a predetermined break in the contents.

Another mode of the present disclosure relates to an information processing method. The information processing method is an information processing method by an information processing device for displaying contents formed by a plurality of pages according to user operation. The information processing method includes: reading out image data of the pages of the contents from a memory; receiving an operation of changing a page as an object of display; and displaying an image of the page using the image data on a display device, and displaying a slide bar displaying a handle indicating a position of the page being displayed on a bar representing the pages of a whole of the contents as a GUI on the display device. When a user operation of sliding the handle on the slide bar is received in the receiving the operation, display is changed to a page corresponding to a reached position of the handle in the displaying. When a user operation on predetermined operating means of an input device is received in the receiving the operation, display is changed to a page serving as a predetermined break in the contents in the displaying.

Still another mode of the present disclosure relates to a computer readable recording medium. The computer readable recording medium is a computer readable recording medium storing a computer program for making a computer display contents formed by a plurality of pages according to user operation. The computer program includes: receiving an operation of changing a page as an object of display; and displaying a slide bar displaying a handle indicating a position of the page being displayed on a bar representing the pages of a whole of the contents as a GUI on a display device together with an image of the page being displayed. When the receiving the operation receives a user operation of sliding the handle on the slide bar, the displaying changes display to a page corresponding to a reached position of the handle. When the receiving the operation receives a user operation on predetermined operating means of an input device, the displaying changes display to a page serving as a predetermined break in the contents.

It is to be noted that arbitrary combinations of the above constituent elements as well as modes realized by converting expressions of the present disclosure between a method, a device, a system, a computer program, a recording medium on which the computer program is recorded, and the like are also effective as modes of the present disclosure.

According to the present disclosure, an information processing technology can be realized which displays contents with excellent operability and excellent accessibility.

BRIEF DESCRIPTION OF THE DRAWINGS

FIG. 3 is a diagram showing a circuit configuration of the information processing device in the present embodiment;

FIG. 4 is a diagram showing functional blocks of the information processing device in the present embodiment;

DETAILED DESCRIPTION OF THE PREFERRED EMBODIMENT

Description will first be made of an example of external constitution and an example of circuit configuration of an information processing device according to a present embodiment. However, the information processing device shown in the following is an example, and may be another kind of electronic apparatus or terminal device.

Figure 1A:
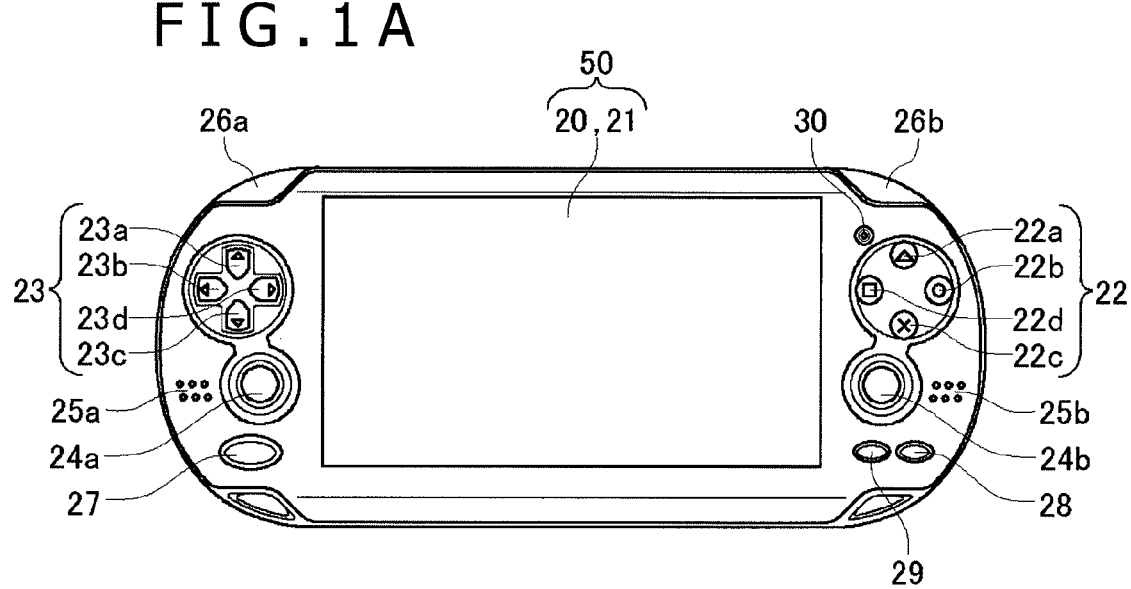
FIG. 1A is a diagram showing the front of an information processing device in a present embodiment.

FIG. 1A shows the front of the information processing device 10. The information processing device 10 is formed in a horizontally long housing. The right and left sides of the housing, which are held by a user, have an arc-shaped outer surface. On the front surface of the information processing device 10 is provided a rectangular touch panel 50. The touch panel 50 includes a display device 20 and a front touch pad 21 that is transparent and covers the surface of the display device 20. The display device 20 is an organic Electro-Luminescence (EL) panel, and displays an image. Alternatively, the display device 20 may be display means such as a liquid crystal panel or the like. The front touch pad 21 is a multi-touch pad having a function of detecting a plurality of points touched concurrently. The touch panel 50 is configured as a multi-touch screen.

At the right of the touch panel 50 are provided a triangle button 22a, a circle button 22b, a cross button 22c, and a square button 22d (hereinafter referred to as "control buttons 22" when referred to collectively). The buttons are each located at the vertices of a rhombus. At the left of the touch panel 50 are provided an up key 23a, a left key 23b, a down key 23c, and a right key 23d (hereinafter referred to as "directional keys 23" when referred to collectively). A user can input eight directions (up, down, left, and right directions, and diagonal directions) by manipulating the directional keys 23.

Below the directional keys 23, a left stick 24a is provided, and below the control buttons 22, a right stick 24b is provided. A user tilts the left stick 24a or the right stick 24b (hereinafter referred to as "joysticks 24" when referred to collectively) so as to input the direction and the degree of the tilt. On the upper left and upper right of the housing an L button 26a and an R button 26b are provided, respectively. The control buttons 22, the directional keys 23, the joysticks 24, the L button 26a, and the R button 26b implement manipulation means for user manipulation.

In the vicinity of the control buttons 22, a front camera 30 is provided. At the left of the left stick 24a and at the right of the right stick 24b, a left speaker 25a and a right speaker 25b (hereinafter referred to as "speakers 25" when referred to collectively) that output sound are provided respectively. Further, below the left stick 24a is provided a HOME button 27 and below the right stick 24b are provided a START button 28 and a SELECT button 29.

Figure 1B:
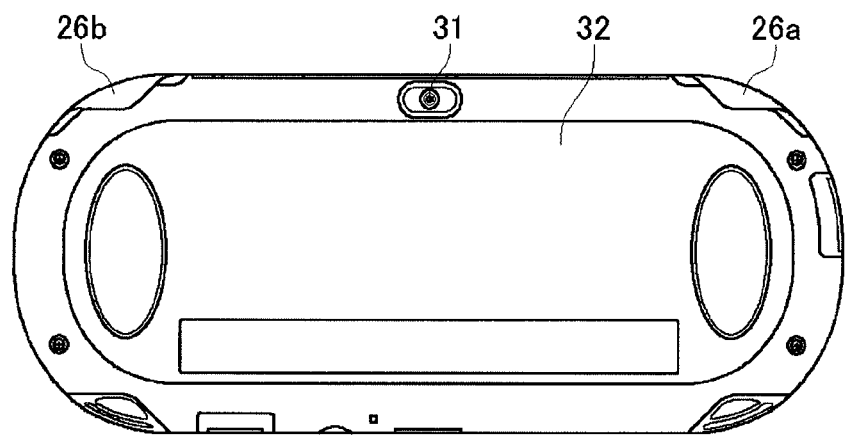
FIG. 1B is a diagram showing the rear of the information processing device.

FIG. 1B shows the rear of the information processing device 10. On the rear surface of the information processing device 10, a rear camera 31 and a rear touch pad 32 are provided. In a similar manner as that of the front touch pad 21, the rear touch pad 32 is configured as a multi-touch pad. Two cameras and two touch pads are mounted on the information processing device 10 at the front and rear surfaces.

Figure 2A:
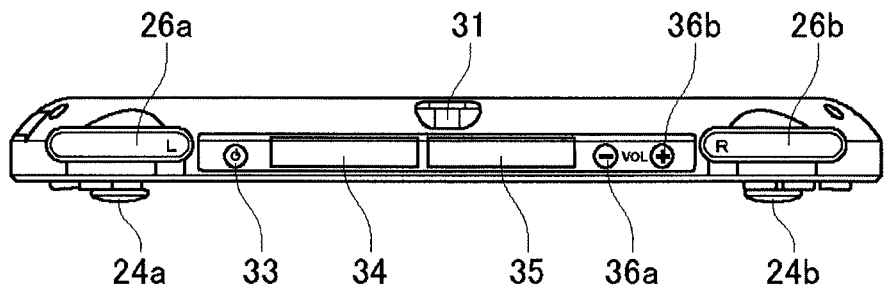
FIG. 2A is a diagram showing the top surface of the information processing device in the present embodiment.

FIG. 2A shows the top view of the information processing device 10. As described previously, at the left and right edges of the top surface of the information processing device 10 are provided the L button 26a and the R button 26b, respectively. At the right of the L button 26a, a power button 33 is provided. A user turns the power on or off by pressing the power button 33. The information processing device 10 is provided with a power control function that makes a transition to a suspend state if a time period during which no operation is input (non-operation time period) lasts for a predetermined time period. If the information processing device 10 enters the suspend state, a user can return the information processing device 10 from the suspend state to an awake state by pressing the power button 33.

A game card slot 34 is a slot for inserting a game card. FIG. 2A shows the game card slot 34 that is covered by a slot cover. In the vicinity of the game card slot 34, an LED lamp may be provided that blinks when a game card is accessed. An accessory terminal 35 is a terminal for connecting a peripheral device (accessory). FIG. 2A shows the accessory terminal 35 that is covered by a terminal cover. Between the accessory terminal 35 and the R button 26b are provided a minus button 36a and a plus button 36b for adjusting volume.

Figure 2B:
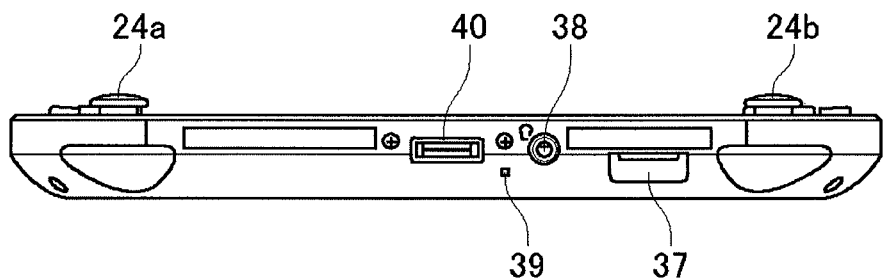
FIG. 2B is a diagram showing the bottom surface of the information processing device.

FIG. 2B shows the bottom view of the information processing device 10. A memory card slot 37 is a slot for inserting a memory card. FIG. 2B shows the memory card slot 37 that is covered by a slot cover. On the bottom surface of the information processing device 10 are provided an audio input and output terminal 38, a microphone 39, and a multi-use terminal 40. The multi-use terminal 40 supports Universal Serial Bus (USB), and can be connected to another device via a USB cable.

Figure 2C:
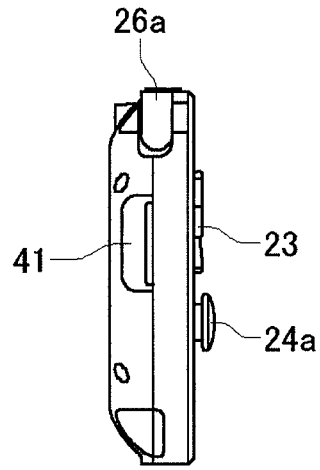
FIG. 2C is a diagram showing the left side surface of the information processing device.

FIG. 2C shows the left side view of the information processing device 10. On the left side face of the information processing device 10 is provided a subscriber identity module (SIM) card slot 41, which is a slot for inserting a SIM card.

FIG. 3 shows the circuit configuration of the information processing device 10. Respective elements thereof are connected to one another via a bus 92. A wireless communication module 71 includes a wireless LAN module that complies with a communication standard such as IEEE802.11b/g or the like. The wireless communication module 71 is connected to an external network such as the Internet or the like via a wireless access point or the like. The wireless communication module 71 may be provided with a Bluetooth (registered trademark) protocol communication function. A mobile phone module 72 supports the 3rd Generation digital mobile phone system that complies with the International Mobile Telecommunication 2000 (IMT-2000) defined by the International Telecommunication Union (ITU). The mobile phone module 72 is connected to a mobile phone network 4. Inserted in the SIM card slot 41 is a SIM card 74, on which a unique ID number for identifying the telephone number of a mobile phone is stored. As a result of the SIM card 74 being inserted in the SIM card slot 41, the mobile phone module 72 can communicate with the mobile phone network 4.

A Central Processing Unit (CPU) 60 executes a program or the like loaded onto a main memory 64. A Graphics Processing Unit (GPU) 62 performs calculations required for image processing. The main memory 64 is configured with Random Access Memory (RAM) or the like, and stores a program and/or data to be used by the CPU 60. A storage 66 is configured with a NAND-type flash memory or the like, and is utilized as a built-in auxiliary storage device.

A motion sensor 67 detects the movement of the information processing device 10, and a geomagnetic sensor 68 detects earth-geomagnetism in each of the three-axis directions. A GPS control section 69 receives signals from the GPS satellites and calculates the current position. The front camera 30 and the rear camera 31 capture an image and input the image data thereof. The front camera 30 and the rear camera 31 are configured with a Complementary Metal Oxide Semiconductor (CMOS) image sensor.

The display device 20 is an organic EL display device, and provided with a light emitting element which emits light when a voltage is applied between a negative electrode and a positive electrode. During power saving mode, by reducing the voltage to be applied between the electrodes to a level below that of a normal mode, the display device 20 can be turned into a low-light state. Thus, the power consumption can be restricted. Alternatively, the display device 20 may be a liquid crystal display device provided with a backlight. During power saving mode, by reducing the light intensity of the backlight, the liquid crystal display device can be turned into a low-light state. Thus, the power consumption can be restricted.

In an interface 90, an operating section 70 includes various manipulation means provided in the information processing device 10. More specifically, the operating section 70 includes the control buttons 22, the directional keys 23, the joysticks 24, the L button 26a, the R button 26b, the HOME button 27, the START button 28, the SELECT button 29, the power button 33, the minus button 36a, and the plus button 36b. The front touch pad 21 and the rear touch pad 32 are a multi-touch pad. The front touch pad 21 is arranged so as to be overlaid on the surface of the display device 20. The speakers 25 output sound generated by respective functions of the information processing device 10. The microphone 39 inputs sound from around the information processing device 10. The audio input and output terminal 38 inputs stereo sound from an external microphone and outputs stereo sound to an external headphone or the like.

In the game card slot 34, a game card 76 that stores a game file is inserted. The game card 76 is provided with a storage area where data can be written. If the game card 76 is placed in the game card slot 34, data is written/read by a media drive. In the memory card slot 37, a memory card 78 is inserted. When the memory card 78 is placed into the memory card slot 37, the memory card 78 is utilized as an external auxiliary storage device. The multi-use terminal 40 can be utilized as a USB terminal. The multi-use terminal 40 is connected to a USB cable 80 and transmits data to and receives data from another USB device. To the accessory terminal 35, a peripheral device is connected.

The information processing device 10 in the present embodiment not only performs game and communicating functions but also functions as a portable terminal for enjoying various kinds of contents such as electronic books, video, music, and the like. The electronic data of the contents is downloaded from a content providing server via the network, and stored in the storage 66. Alternatively, the electronic data of the contents is stored in the memory card 78 inserted in the memory card slot 37.

The electronic data of the contents is then read according to an output request from the user, and subjected to decoding processing and the like as appropriate. The electronic data of the contents is consequently output from the display device 20 and the speakers 25. In the present embodiment, attention will be directed mainly to methods for operating the display screen using the operating section 70 and the front touch pad 21 at a time of viewing of an electronic book. Description of processing and configurations to which ordinary technologies can be applied, which processing is included in processing for displaying an electronic book selecting screen and an electronic book viewing screen, will be omitted as appropriate. Incidentally, contents to be processed in the present embodiment are not limited to electronic books, but may be games, Web pages, or the like as long as the contents involve display of documents and/or images formed by a plurality of pages. In addition, the present embodiment is not limited to completed contents, but may be applicable also to display of electronic data such as documents, images, or the like being created by the user.

FIG. 4 shows functional blocks of the information processing device 10. The figure shows, in particular, functions implemented by the CPU 60, the GPU 62, the main memory 64, and the storage 66 in FIG. 3 as a control block 100. The functional blocks included in the control block 100 can be formed, in terms of hardware, by the CPU 60, the GPU 62, the main memory 64, the storage 66, and the like as described above, and can be implemented, in terms of software, by a program loaded from various kinds of storage devices or an inserted recording medium within the information processing device 10 into the main memory 64 or the like. Hence, it is to be understood by those skilled in the art that these functional blocks can be implemented in various forms by only hardware, only software, or a combination of hardware and software, and are not limited to one of the forms.

The control block 100 includes: an operation receiving section 102 receiving information related to operating input by the user; a book data storage section 108 storing the data of electronic books; a display screen control section 104 controlling a page and a region for display; and an output data generating section 110 generating a display image and output audio. The operation receiving section 102 receives a signal indicating details of an operation performed on the information processing device 10 by the user from operating means such as the operating section 70, the front touch pad 21, or the like, and supplies the signal to the display screen control section 104. The data of the electronic books as objects of display is stored in the book data storage section 108 in advance.

When the user performs an operation of selecting one book from an electronic book selecting screen displayed on the display device 20 via the operating section 70, for example, information on the operation is notified from the operation receiving section 102 to the display screen control section 104, and the display screen control section 104 recognizes the electronic book as an object of display. At this time, in terms of hardware, the corresponding electronic data is loaded from the storage 66 or the memory card 78 into the main memory 64 in FIG. 3. The data of the electronic book includes image data for each page and additional data such as bibliographic information, information on a table of contents, and the like.

The display screen control section 104 controls an electronic book display screen according to user operation received by the operation receiving section 102. It is to be noted that the user operation received by the information processing device 10 is not limited to user operation to be described later. When a same function can be operated by a plurality of means, the user can properly use the operating means according to conditions at a time of the usage or preferences of the user. The display screen control section 104 includes a display page control unit 114 and a display region control unit 116.

When the operation receiving section 102 receives an operation of changing a page as an object of display, the display page control unit 114 identifies a page after the change or controls display of information for the changing operation. In the present embodiment, a function of displaying a next page or a previous page in order and a function of moving display to another page in one stroke are implemented. The former operation will hereinafter be referred to as "paging," and the latter operation will hereinafter be referred to as a "page jump."

At a time of the paging operation, an expression is made such that, for example, in a state of two pages of a double-page spread being displayed simultaneously, the page on the left side is turned by depressing the L button 26a of the operating section 70 or the page on the right side is turned by depressing the R button 26b, and consequently a next page appears. Here, suppose that relation between the turned left or right page and a direction of progression of description contents is similar to that of an actual book. In place of the L button 26a/R button 26b, the left key 23b/right key 23d of the direction keys 23 of the operating section 70 or tilting in a left direction/tilting in a right direction of the left stick 24a may be used.

Alternatively, an operation of sweeping a finger that is in contact with the front touch pad 21 (flick operation) may turn a page in a direction in which the finger is swept. Incidentally, when a left/right direction is input by using the joystick 24 such as the left stick 24a or the like, and the joystick 24 is configured to be tiltable in all directions, ranges of tilting directions in which ranges tilting in the left direction/tilting in the right direction can be determined to be performed are each set in advance. The same is true for input of an upward/downward direction using the joystick 24 to be described later.

Provided for the page jump operation are a function of moving a display page to each of description units formed by dividing the contents of an electronic book, such as chapters of a novel, articles of a magazine or a newspaper, first letters of a language included in a dictionary, and the like, by some rule, and a function of moving display to an arbitrary page. In order to realize the former, pages including the beginning parts of respective description units and positions where the beginning parts are present in page images are stored as additional data of the book in the book data storage section 108. Incidentally, as for a book or the like formed such that one page is not divided but coincides with the beginning part of a description unit or the head of pages, it suffices to obtain only information on the page including the beginning part. In this case, ordinary information on a table of contents can be used.

In order to realize the page jump operation, the display page control unit 114 performs control so as to display a slide bar representing all pages of a book by a number line. The slide bar is displayed in addition to a page image being displayed, by operating predetermined operating means, such for example as depressing the square button 22d of the operating section 70. A page jump operation is received during a period during which the slide bar is displayed. A paging operation is received as described above during a period during which the slide bar is not displayed. By thus changing a mode according to display/non-display of the slide bar, various operations can be realized even by a small number of operating means.

When the operation receiving section 102 receives an operation of changing a display region, the display region control unit 116 controls a change in the display region according to the operation. Changes in the display region in this case include scrolling when part of a page is displayed and a change in display magnification. Incidentally, scrolling includes gradual movement of the display region over a period of user operation and movement of display to another region in one stroke according to an operation for a short time. In addition, changes in display magnification include a gradual change in magnification over a period of user operation and a change in magnification in one stroke according to an operation for a short time.

In a case where an electronic book is viewed on a screen having a limited area, contrivance is desired particularly for a range displayed on the one screen. That is, when an entire page is displayed at a time, the book appears more realistic, and it is easier to grasp an overview of the book. However, characters and the like may become small and difficult to read. When the display magnification is increased to make the characters easy to read, it becomes difficult to know which position is displayed in an entire image, and in turn know in which direction to perform scrolling next.

Accordingly, in the present embodiment, in an enlarged state, display is allowed to be moved in one stroke to a region to be viewed next to a region being displayed in terms of description contents. For example, operating means capable of specifying a direction, such as the L button 26a/R button 26b, the direction keys 23, the left stick 24a, or the like is used, and the direction (left/right or upward/downward) and a forward direction/opposite direction of display are associated with each other. This enables the display region to be easily advanced forward or returned backward by one unit in response to one time of operation.

An appropriate order of display differs depending on the binding of the book, the layout and column setting of articles, kinds of characters, a direction of description, and the like. Thus, information related to the order in which to make display in terms of description contents is stored as additional data of the book in the book data storage section 108. Alternatively, information related to the display order may be registered in association with the category of the book or the like, and may be selected according to the bibliographic information of the electronic book.

Further, in the present embodiment, the display region control unit 116 sets a region to be enlarged at a time of an enlarging operation appropriately according to conditions. This can prevent the occurrence of conditions in which a target position is lost sight of because the display magnification is changed, for example, and enables the display region to be appropriately changed by only a simple enlarging/reducing operation easily. It is possible, in turn, to grasp an entire page or minutely check part of a page efficiently irrespective of timing. The display page control unit 114 and the display region control unit 116 each notify control information obtained as a result of processing to the output data generating section 110.

The output data generating section 110 reads out the image data of a page as an object of display from the book data storage section 108 as required on the basis of the notified information, decodes the image data, and generates a display image formed of a display region in the image data. In a case where two pages of a double-page spread are used as a basis for display, an image in which images of respective pages are connected horizontally to each other in each pair of two pages is generated, and an image of a display region is extracted. The page decoded once is retained in an internal memory and reused, thereby enabling a quick display change.

When a paging operation is performed, the output data generating section 110 may insert an animation of turning a page during a page change. At this time, a sound effect of turning a page may be generated in synchronism with the animation. By outputting the data of the generated image and the sound effect to the display device 20 and the speakers 25 in appropriate timing, a mode can be realized in which the image is changed or the sound effect is produced according to the operation.

The output data generating section 110 further displays a slide bar for page jump operation according to a request from the display page control unit 114. During a period during which the slide bar is displayed, the output data generating section 110 changes the mode of the slide bar as appropriate so as to correspond to handle operation by the user or page change in description units.

Figure 5:
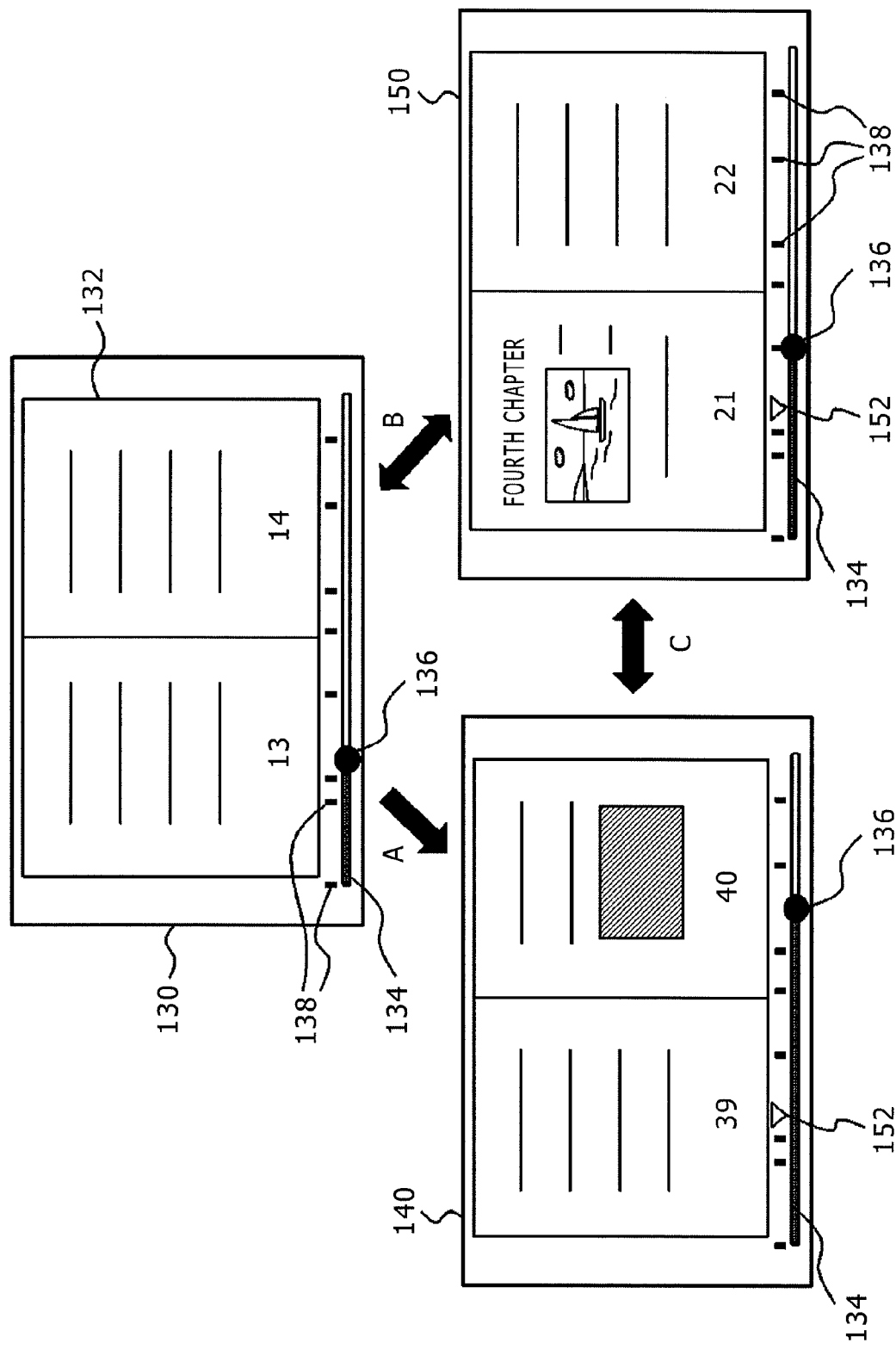
FIG. 5 is a diagram showing an example of transitions of a screen when a slide bar is displayed and page jump operations are performed in the present embodiment.

Description will next be made of a concrete example of page change processing by the display page control unit 114. FIG. 5 shows an example of transitions of the screen when the slide bar is displayed and page jump operations are performed. At this time, as shown on a screen 130 in a top row of FIG. 5, the screen includes a page image 132 and a slide bar 134. As described above, the slide bar 134 is made to appear by operating predetermined operating means in a state of only the page image 132 being displayed. When the operating means is then operated again, the slide bar 134 is set in a non-display state. Incidentally, the disposition of the slide bar 134 is not limited to that shown in FIG. 5. The slide bar 134 may be disposed in a vertical direction, or may be displayed in a state of being superimposed on the page image 132.

The part of a bar in the slide bar 134 represents all of the pages of a book as a number line. In the case of FIG. 5, a left end represents a first page of the book, and a right end represents a last page of the book. A handle 136 is displayed at a position on the bar which position corresponds to a page now being displayed. In the case of the screen 130, the position of a page "13" and a page "14" being displayed as the page image 132 in the whole of the book is indicated by the handle 136. Description unit markers 138 indicating the positions of pages including the beginnings of description units are added as marks to the slide bar 134.

During a period during which the slide bar 134 is thus displayed, the display page control unit 114 receives the above-described two kinds of operations as page jumps. Of the operations, the operation of moving display to an arbitrary page is realized by directly operating the handle 136 so as to slide the handle 136 to a desired position. At this time, the display page control unit 114 identifies the reached position of the handle 136 by obtaining information on the movement of a contact position on the front touch pad 21 via the operation receiving section 102.

Then, the display page control unit 114 calculates a page corresponding to the reached position, and notifies the page corresponding to the reached position to the output data generating section 110. According to this notification, the output data generating section 110 reads out the image data of the page from the book data storage section 108, and displays the image data on the display device 20. As a result, as shown on a screen 140, display can be moved to a page greatly separated from an original page in one stroke (arrow A).

On the other hand, the operation of moving display in description units is realized by operating means capable of specifying a left direction and a right direction, such as the L button 26a/R button 26b, the left stick 24a, or the like. In the present embodiment, a page change mode is changed according to the display/non-display of the slide bar 134. Thus, the same operating means can be used in the paging operation and the page jump operation. Rather, when the same operating means is used, unified operating means can be used in page changes, and therefore the user understands an operating method easily.

At a time of display movement in description units, display is changed to an immediately subsequent or immediately preceding page that includes the beginning part of a description unit according to one time of operation (depression or tilting) for a short time. At this time, when the display page control unit 114 detects that the above-described operating means is operated via the operation receiving section 102, the display page control unit 114 identifies a page to be displayed next by referring to the book data storage section 108, and notifies the page to be displayed next to the output data generating section 110. According to this notification, the output data generating section 110 reads out the image data of the page from the book data storage section 108, and displays the image data on the display device 20.

As a result, as shown on a screen 150, for example, display can be moved to a page including the beginning part of a description unit which page is immediately subsequent to the original page (arrow B). The screen 150 displays a page "21" including the beginning part of "FOURTH CHAPTER" as a next description unit and a page "22" as an adjacent page in a double-page spread. The screen 150 assumes a case where the right is specified by the above-described operating means. In a case where the left is specified, display is moved to a page including the beginning part of an immediately preceding description unit. In addition, the handle 136 is moved to the position of the page after the display change in such a manner as to be operatively associated with the display change.

That is, directing attention to the slide bar 134, display movement in description units is none other than movement of the handle 136 to the position of a nearest description unit marker 138. When this is repeated, the handle 136 moves to the positions of the description unit markers 138 one at a time. Incidentally, an original page position marker 152 is further added to the slide bar 134 on the screen 140 and the screen 150. This marker indicates the position of the pages displayed at a point in time that the slide bar 134 started to be displayed, or the page "13" and the page "14" in the example of FIG. 5.

At a time of page jump operation, the original page position marker 152 is displayed, and the position of the marker is treated in the same manner as the description unit markers 138. That is, at a time of display movement in description units, the handle 136 is stopped also at the position of the original page position marker 152. Thus, after display is once moved to a totally different page by a page jump operation, a return can be easily made to the original page, that is, the state of the screen 130. Incidentally, in the period during which the slide bar 134 is displayed, after one of the two kinds of page jump operations is performed, the other may be performed. In this case, a transition is made between the screen 140 and the screen 150 (arrow C).

Figures 6, 7:
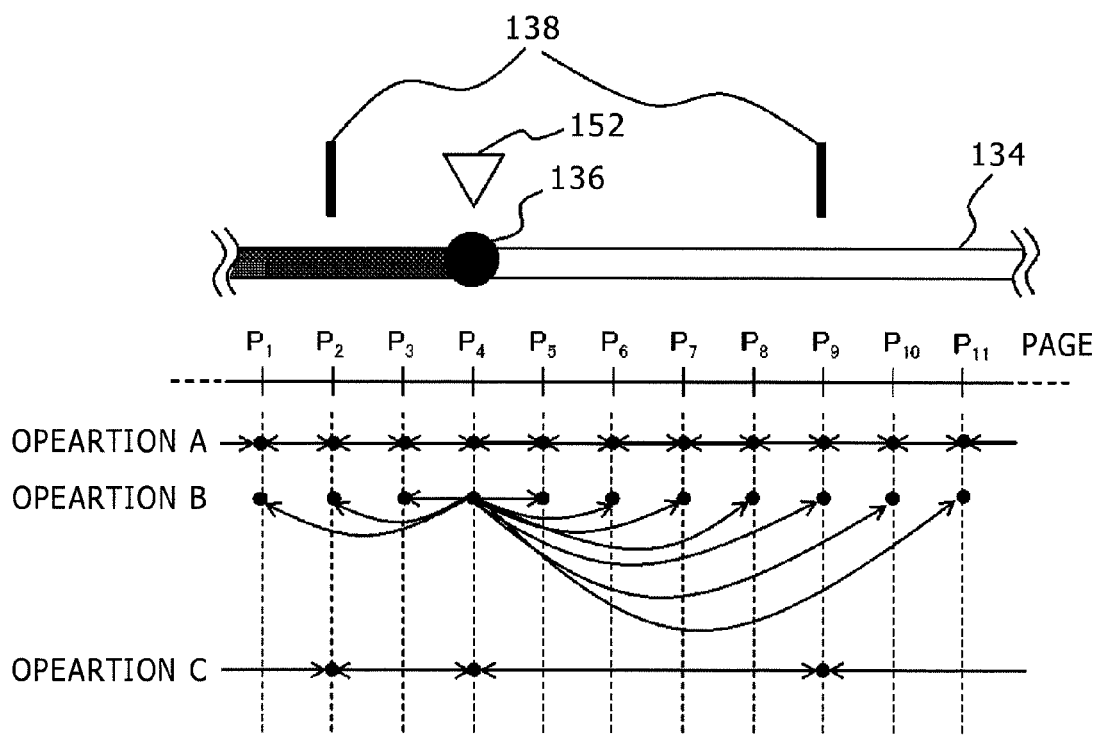
FIG. 6 is a diagram showing an example of data structure of information related to description units which information is stored for each book in a book data storage section in the present embodiment.
FIG. 7 is a diagram of assistance in explaining kinds of page changing operations that are received by the information processing device in the present embodiment.

FIG. 6 shows an example of data structure of information related to description units which information is stored for each book in the book data storage section 108. Description unit information 153 includes an identification number column 154, a page column 156, and a position column 158. One row in the description unit information 153 represents one description unit. The identification number column 154 stores identification numbers given to the respective description units in ascending order in a direction from the first page to the last page of the book. That is, at a time of operation of display movement in description units, display is changed in order of the identification numbers.

The page column 156 and the position column 158 store pages including the beginning parts of the respective description units and description positions of the beginning parts in the pages. On the basis of page numbers stored in the page column 156, the display page control unit 114 adds description unit markers 138 to the corresponding positions on the slide bar. In addition, at a time of operation of display movement in description units, the display page control unit 114 identifies a page to be displayed next on the basis of the page numbers stored in the page column 156.

As will be described later, the description positions of the beginning parts stored in the position column 158 are referred to mainly when the display region control unit 116 changes the display magnification. A description position is for example represented by position coordinates of a predetermined unit on a page image plane. For example, the beginning part of a description unit having an identification number "1," for example, is started at coordinates (10, 10) of a page "1." Supposing that an upper left of the page image is (0, 0), and that units of position coordinates are pixels, this description unit is started at substantially the upper left of the first page. Further, a description unit having an identification number "2" is started at coordinates (10, 10) of a page "2," and a description unit having an identification number "3" is started at coordinates (10, 10) of a page "20."

In this case, not only the description unit having the identification number "3" but also description units having identification numbers "4 and 5" are included in the same page "20." Such a situation tends to occur in a magazine or the like including a plurality of articles such as columns or the like in a same page. In such a case, the description unit marker 138 may indicate the page "20" including these description units by one mark, or may represent the page including the plurality of description units by some means. For example, when three description units are included, the mark may be represented by three straight lines in proximity to each other rather than one straight line, or the straight line may be divided into three segments, or the mark may be represented by three circles. Alternatively, text to that effect may be displayed.

At any rate, the page change processing described thus far is based on movement of display in page units. Thus, even when an operation of display movement between a plurality of description units included in one page is performed, the page image itself is not changed. However, as will be described later, as for an enlargement object region when an enlarging operation is performed, a description unit being selected is reflected in an operation of display movement in description units. For this purpose, even when the page image does not need to be changed, the display page control unit 114 obtains the identification number of the description unit being selected, and notifies the identification number of the description unit being selected to the display region control unit 116.

Incidentally, at a point in time that display movement in description units approaches the page including the plurality of description units, the description unit marker 138 may be separated or text may be displayed according to the number of the description units. Further, the color of a marker corresponding to a description unit being selected among thus separated markers may be changed from that of the other markers, or the marker may be highlighted, to indicate not only that the plurality of description units are included in the one page but also the number of the description unit being selected among the plurality of description units. This makes it possible to notify the user that the operation of display movement in description units is recognized, by means other than a change in the page image.

FIG. 7 is a diagram of assistance in explaining kinds of page changing operations that are received by the information processing device 10. In FIG. 7, pages P1, P2, . . . , P11, . . . of the book are indicated on an axis of abscissas, and pages displayed by three kinds of operations, that is, operation A, operation B, and operation C are represented by black dots in respective rows below the axis of abscissas. In addition, a top row in FIG. 7 shows in enlarged dimension a range of the slide bar 134 which range corresponds to these pages. Incidentally, P1, P2, . . . , P11, . . . are not necessarily intended to correspond each to one page of the book, but each denote two pages when two pages are displayed at a time as shown in FIG. 5.

In a state in which the slide bar 134 is not displayed, paging is performed one page at a time in response to one time of operation by the L button 26a/R button 26b or by the tilting in the left direction/tilting in the right direction of the left stick 24a (operation A). That is, P1, P2, . . . , P11, . . . are displayed in order. When the slide bar 134 is displayed by an operation of predetermined operating means such as the square button 22d or the like by the user, operation B and operation C are enabled. In FIG. 7, suppose that a page P4 is displayed when the slide bar 134 starts to be displayed.

In this case, display is allowed to be moved to an arbitrary page by directly operating the handle 136 so as to slide the handle 136 with a finger or the like (operation B). In addition, movement by one description unit is allowed to be performed in response to one time of operation by the L button 26a/R button 26b or by the tilting in the left direction/tilting in the right direction of the left stick 24a (operation C). When the slide bar 134 is displayed while the page P4 is displayed, the original page position marker 152 is displayed at the page P4. Then, not only pages P2 and P9 including the beginning parts of description units, the pages P2 and P9 being set in advance and indicated by description unit markers 138, but also the original page P4 is set as objects of display in operation C. Incidentally, when the user performs a predetermined operation such as depressing the square button 22d or the like again, the slide bar 134 is set in a non-display state, and thus operation A is enabled.

It is to be noted that the shapes of the slide bar 134 and the description unit markers 138 are not limited to those shown in the figures. Particularly when the description units have a hierarchical structure as in a case where one chapter is divided into a plurality of sections, for example, efficiency of reaching a desired page is improved by making the description unit markers 138 also represent the hierarchical structure. The description unit markers 138 are varied in length according to the layers of the hierarchical structure by for example making a description unit marker 138 for a larger unit longer. In addition to length, one of thickness, color, and shape may be varied, or a combination of two or more thereof may be changed simultaneously. Alternatively, the description unit markers 138 may be in a plurality of arrangements, and may be shown in different arrangements for the respective layers. At this time, all of the arrangements may be displayed simultaneously, or one of the arrangements may be displayed after being selected by predetermined operating means.

Figure 8:
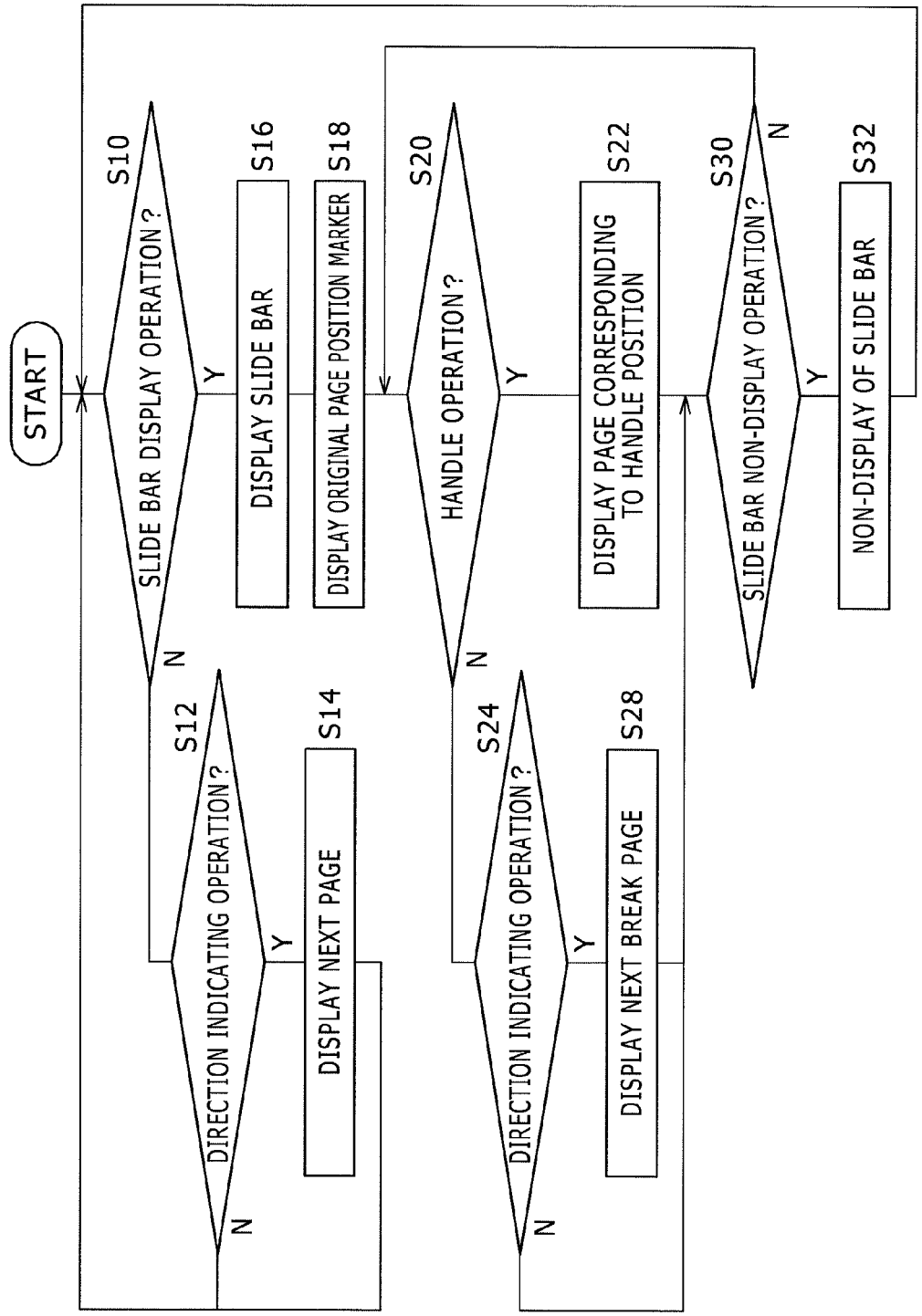
FIG. 8 is a flowchart of a procedure for processing performed by the information processing device in the present embodiment in response to page changing operation.

Description will next be made of the operation of the information processing device 10 which operation can be realized by the above-described configuration. FIG. 8 is a flowchart of a procedure for processing performed mainly by the display page control unit 114 and the output data generating section 110 of the information processing device 10 in response to page changing operation. This flowchart is started in a stage in which the user has selected a book as an object of display and an initial page of the book is displayed. Incidentally, at a point in time that the display of the book is ended, the processing of this flowchart is also ended, which is not shown in FIG. 8.

When it is detected that an operation of specifying a left or right direction by the L button 26a/R button 26b or the left stick 24a is performed without an operation of displaying the slide bar 134 being performed in a state in which the initial page is displayed (N in S10 and Y in S12), the display page control unit 114 makes the output data generating section 110 display a next page in the specified direction (S14).

During a period during which none of a slide bar display operation and a direction indicating operation is performed, the same page continues to be displayed, and the processing waits for one of these operations to be performed (N in S10 and N in S12). However, during this period, the display region control unit 116 may separately perform scrolling processing and display magnification changing processing. When an operation of displaying the slide bar 134 is performed (Y in S10), the display page control unit 114 makes the output data generating section 110 display the slide bar 134 (S16). At this time, the page column 156 of the description unit information 153 stored in the book data storage section 108 is referenced to add description unit markers 138 to corresponding positions on the slide bar 134.

Further, the original page position marker 152 is displayed at a position corresponding to a page displayed at that point in time (S18). However, the original page position marker 152 may be displayed after an operation of changing to another page is performed. When the handle on the slide bar 134 is operated next, the display page control unit 114 detects the operation of the handle according to the contact position of a finger of the user (Y in S20), and makes the output data generating section 110 display a page corresponding to the reached position of the handle (S22). When it is detected that an operation of specifying a left or right direction by the L button 26a/R button 26b or the left stick 24a is performed (Y in S24), on the other hand, the display page control unit 114 makes the output data generating section 110 display a page that includes the beginning of a description unit and which is present at a nearest position in the specified direction (S28).

While an operation of setting the slide bar 134 in a non-display state is not performed in a case where none of the operations is performed in the state in which the slide bar 134 is displayed (N in S20 and N in S24) or in a case where processing corresponding to one of the operations is completed, the processing waits for one of the operations to be performed (N in S30). When an operation of setting the slide bar 134 in a non-display state is performed (Y in S30), the slide bar 134 is set in a non-display state (S32). The processing waits for a next direction indicating operation or a next slide bar display operation. Incidentally, in a stage in which the slide bar 134 is set in a non-display state in S32, information on the position of the original page position marker 152 displayed in S18 is reset. Therefore, when the slide bar 134 is displayed next time, the original page position marker 152 corresponding to a page being displayed at that point in time is newly displayed.

Figure 9:
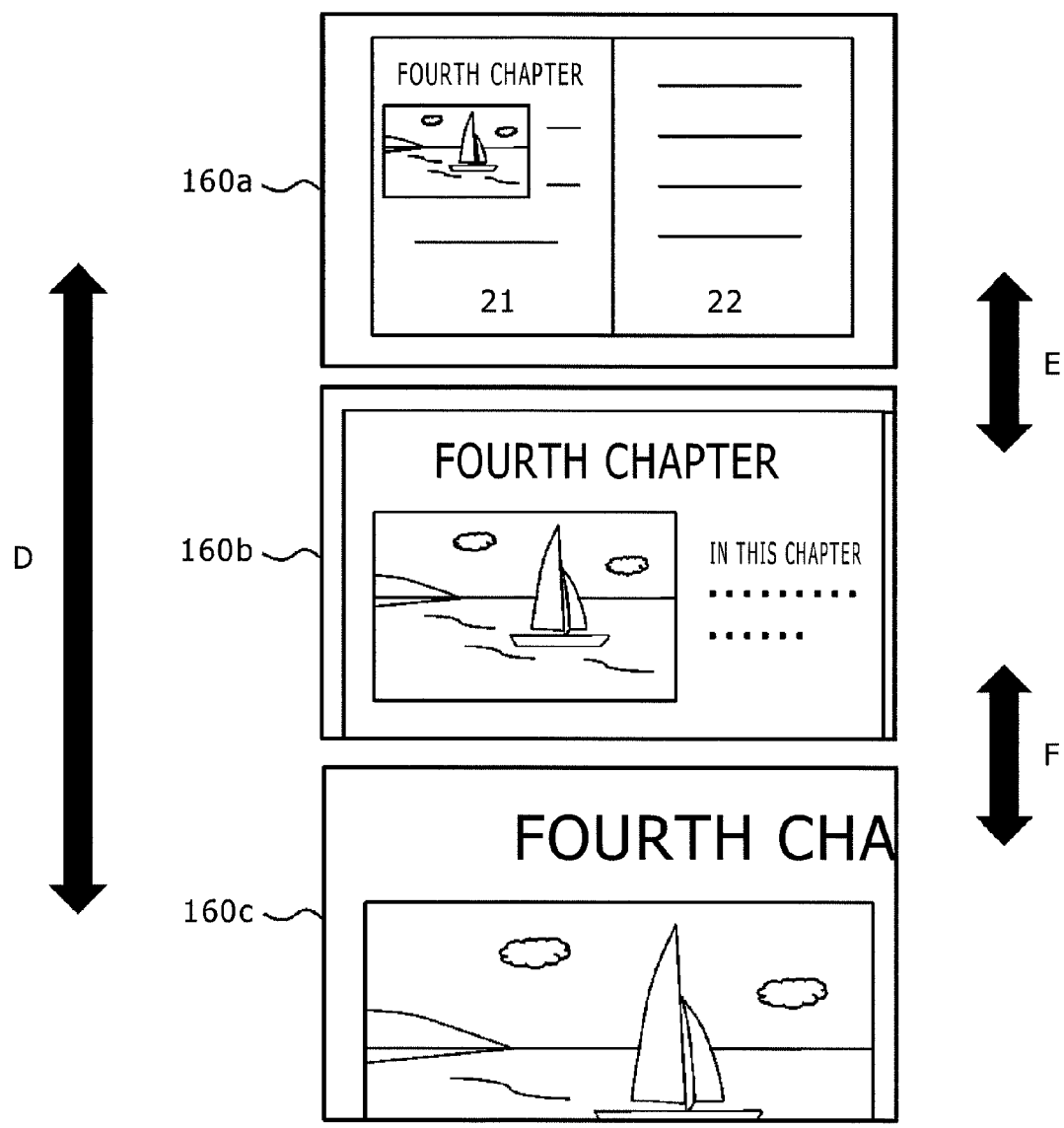
FIG. 9 is a diagram showing an example of transitions of the screen when display magnification is changed in the present embodiment.

Description will next be made of a concrete example of display region changing processing by the display region control unit 116. FIG. 9 shows an example of transitions of the screen when the display magnification is changed. A screen 160a in a top row of FIG. 9 is for example a screen displayed when pages are changed as described in the description thus far. The screen 160a displays a page image at a lowest magnification that makes it possible to look over the whole of pages. Incidentally, as in the examples thus far, FIG. 9 shows an image of two pages displayed on one screen. However, the number of pages displayed at the time of the lowest magnification is not intended to be limited to this.

When an operation of increasing the magnification is performed by predetermined operating means of the operating section 70 in this case, the display magnification is increased from that of the screen 160a to that of a screen 160b to that of a screen 160c, so that a change is made to the screen on which part of a page is enlarged. In this case, the page image displayed on the screen 160c is set at a maximum magnification. When an operation of conversely decreasing the magnification is performed, the screen changes from the screen 160c to the screen 160b to the screen 160a. As described above, the present embodiment realizes a mode in which the magnification is gradually changed over the period of an operation by the user (arrow D) and a mode in which the magnification is changed in one stroke by one time of operation (arrows E and F). In the case of FIG. 9, as the latter mode, the magnification is changed in two steps by two times of operation. However, the number of steps is not limited to this. In addition, in the former mode, the screen is changed gradually in a very short time such that interpolation is performed between the screens shown in FIG. 9.

The tilting in an upward direction/tilting in a downward direction of the right stick 24b, for example, is used as operating means for such magnification changes. That is, the display magnification is changed in an enlarging direction when the right stick 24b is tilted in the upward direction, and the display magnification is changed in a reducing direction when the right stick 24b is tilted in the downward direction. Further, switching is performed between a stepless change indicated by the arrow D and stepwise changes indicated by the arrows E and F according to a temporal change in amount of tilting.

Figure 10:
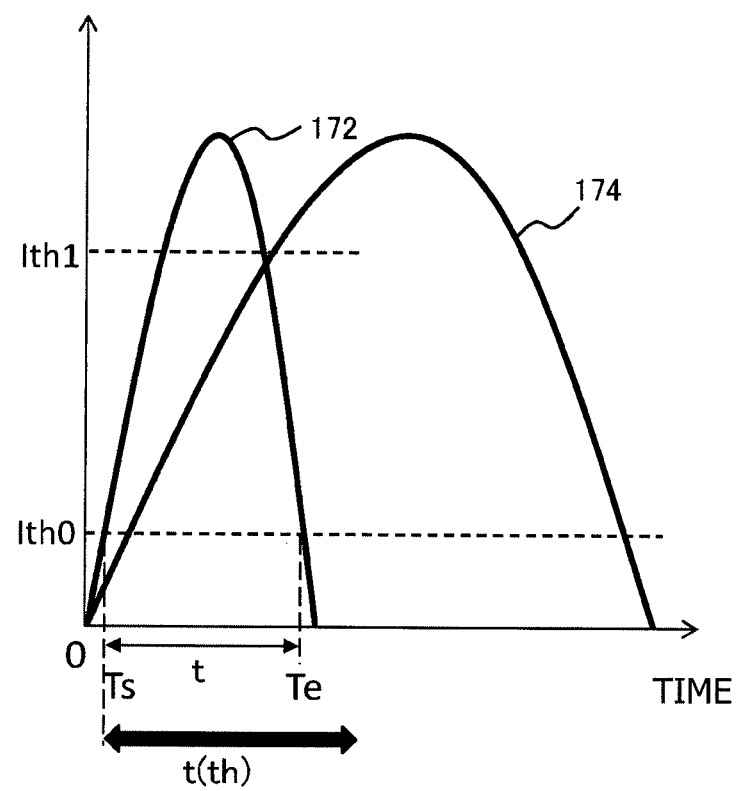
FIG. 10 is a diagram of assistance in explaining a method for determining stepless change/stepwise change in the display magnification according to a temporal change in amount of tilting in the present embodiment.

FIG. 10 is a diagram of assistance in explaining a method for determining stepless change/stepwise change in the display magnification according to a temporal change in the amount of tilting. FIG. 10 shows temporal changes 172 and 174 in the amount of tilting as two patterns, with an axis of ordinates indicating the amount of tilting of the right stick 24b and with an axis of abscissas indicating time from a start of tilting. An amount of tilting Ith0 in FIG. 10 is a threshold value for determining that the stick is tilted when the amount of tilting is equal to or more than the amount of tilting Ith0. An amount of tilting Ith1 is a threshold value for determining that the stick is tilted to substantially a maximum when the amount of tilting becomes equal to or more than the amount of tilting Ith1.

The temporal change 172 in the amount of tilting indicates that the stick is returned to an original state after being tilted to the maximum amount in a shorter time as compared with the temporal change 174 in the amount of tilting. In a case of a joystick having an ordinary structure that returns to a neutral position in a state of no force being applied to the joystick, for example, such an operation can be realized by flicking the joystick in a desired direction. When such an operation is performed in the upward direction or the downward direction, it is determined that the operation is an operation of changing the display magnification stepwise. Therefore, a threshold value is set as a time from a start of tilting that exceeds the threshold value Ith1 for determining the maximum amount of tilting to a return to an original state.

In this case, time t from time Ts that the amount of tilting becomes the threshold value Ith0 for determining a start and an end of tilting after the amount of tilting increases from a neutral state to time Te that the amount of tilting becomes the threshold value Ith0 again after the amount of tilting changes to decrease is measured as the time from the start of tilting to a return to an original state. That is, when time t confirmed at time Te is shorter than the threshold value t(th), the display magnification is changed by one step immediately after time t. When an operation of slowly changing the amount of tilting as indicated by the temporal change 174 in the amount of tilting is performed, on the other hand, a stepless change is made which changes the display magnification so as to correspond to a change in the amount of tilting in an increasing period.

In the case of FIG. 10, the temporal change 174 in the amount of tilting reaches the same amount of tilting as the temporal change 172 in the amount of tilting. However, the reached amount of tilting varies according to the display magnification after the operation which display magnification is desired by the user. Incidentally, when such a criterion for determination is used, the display magnification changes according to the amount of tilting also in the case of the temporal change 172 in the amount of tilting until time Te at which it is determined that an operation of changing the display magnification stepwise is performed. However, because of the nature of the operation of the flick, it suffices for the threshold value t(th) to be a very short time of about 0.2 seconds. There is thus a small possibility of a display change during that period causing a feeling of strangeness.

FIG. 10 shows a method of properly using one operating means easily for a stepless change/stepwise change in the display magnification. However, the operating means is not limited to this. For example, a stepless enlargement or reduction is realized by increasing or decreasing an interval between a thumb and an index finger in contact with the front touch pad 21, that is, a so-called pinch-out or pinch-in operation, and the display magnification may be changed stepwise by flicking one finger on the front touch pad 21, that is, a so-called flick operation. In the latter case, a rule is set such that, for example, an enlargement by one step is performed by one time of flick operation in the upward direction and a reduction by one step is performed by one time of flick operation in the downward direction, as in stick operations, for example.

In addition, as operation of changing the display magnification stepwise, an enlargement by one step may be performed when an interval between two fingers such as a thumb and an index finger or the like in contact with the front touch pad 21 is increased by a predetermined amount or more within a predetermined time by flicking one or both of the two fingers as in a flick operation, or a reduction by one step may be performed when the interval between two fingers is decreased by the predetermined amount or more within the predetermined time. This operation corresponds to performing a movement similar to that of the above-described pinch-out or pinch-in with the moving speed of the fingers increased. Thus, the understanding of the user is facilitated when this operation is paired with a stepless enlarging or reducing operation by the above-described pinch-out or pinch-in.

In addition, in the case where a flick operation with one finger is used to change the display magnification stepwise as described above, for example, a stepless enlargement or reduction may be realized by a so-called drag operation, in which one finger in contact with the front touch pad 21 is moved gradually. Also in this case, the flick operation and the drag operation can be a pair of operations for a stepwise change in the display magnification and a stepless change in the display magnification, so that understanding is facilitated. In this case, a rule is set such that, for example, a drag operation in the upward direction is performed for a gradual enlargement by an amount of change corresponding to an amount of dragging and a drag operation in the downward direction is performed for a gradually reduction by an amount of change corresponding to an amount of dragging, as in the stick operations, for example. Such an enlarging or reducing operation using one finger is effective in terms of efficiency and operability particularly in a situation in which positions do not need to be specified on the display screen as in a case where a touch pad is used as an input device separate from the display screen, for example.

Figure 11:
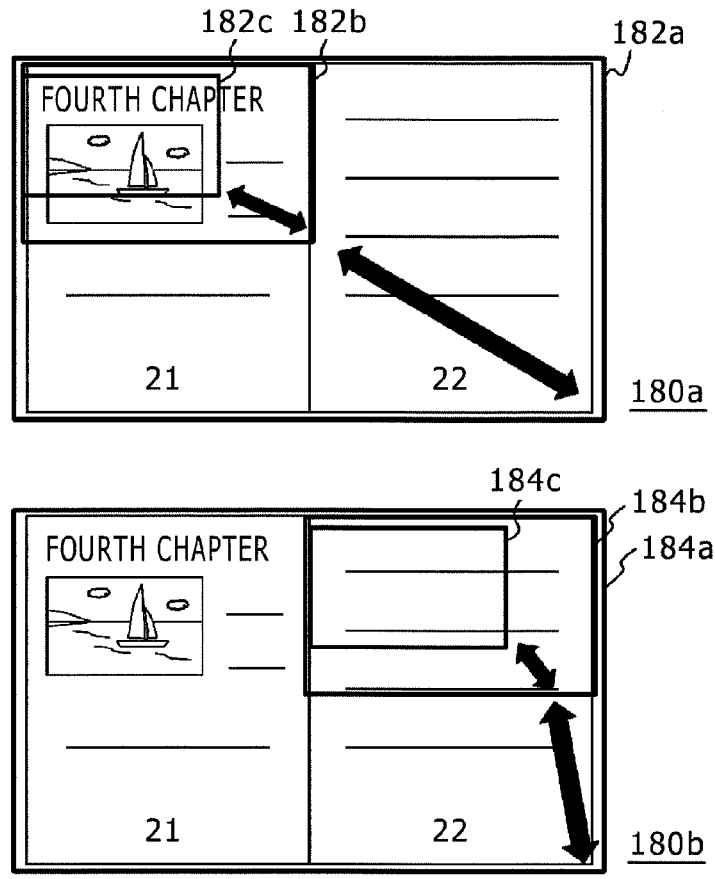
FIG. 11 is a diagram illustrating changes in a display region in response to operations of changing the display magnification in the present embodiment.

Regardless of whether the joystick is used or whether a finger is used, in a case where the display magnification is changed by simple operations as described above, an appropriate region is desirably enlarged when the display magnification is increased. Accordingly, as described above, the display region control unit 116 changes a region to be enlarged in an operation of increasing the display magnification (which region will hereinafter be referred to as a "target region") according to conditions of the moment. FIG. 11 illustrates two kinds of changes in the display region in response to operations of changing the display magnification. FIG. 11 shows, as a thick-line rectangle, the display region in a page image of a double-page spread when the display region is displayed at three magnifications.

In a change example 180a, a region 182a of the whole of the page image of two pages is displayed at a time of a minimum magnification. When an operation of increasing the magnification is performed in this state, the display region becomes a region 182b and then changes to a display region 182c at a time of a maximum magnification. The transitions of the screen as shown in FIG. 9 are realized by this change. In this case, the target region is the upper left region 182c in the page image. When the display magnification is decreased, a change opposite to the above change is made.

Incidentally, in a case of an operation of changing the display magnification stepwise, the display region changes between the regions 182a, 182b, and 182c. In a case of a stepless change in the display magnification, the display region changes gradually such that interpolation is performed between these regions. For operations of changing the display magnification stepwise, an intermediate magnification for displaying the region 182b is set in advance in addition to the minimum magnification and the maximum magnification. For example, as shown in FIG. 11, the intermediate magnification is set such that the horizontal length of one page of the two pages of the double-page spread corresponds to the horizontal length of the screen. In addition, the intermediate magnification may be determined by various criteria such as the characteristics, size, and the like of the book. The magnification thus determined may be stored in the book data storage section 108 in association with the book.

As compared with the change example 180a, the target region is different in a change example 180b. Specifically, an operation of increasing the display magnification effects a change from a display region 184a of the whole of the page image through a display region 184b at a time of the intermediate magnification to a target region 184c at a time of the maximum magnification. The target region 184c is substantially the center of the page image of the two pages of the double-page spread, or specifically an upper left region of the page on the right side. When the display magnification is decreased, a change opposite to the above change is made. Thus, even when the same page image is displayed, the target region is changed according to conditions.

In order to determine the target region appropriately according to conditions, the following determination rule, for example, is provided.
(1) When a new page image is displayed by a paging operation or an operation of display movement to an arbitrary page, a region including the beginning of the page is set as the target region in principle.
(2) When a reducing operation is performed after scrolling, a display region at a time of a start of reduction is set as the target region.
(3) When an operation of display movement in description units is performed, a region including the beginning of a description unit being selected is set as the target region.

When a page is turned by a paging operation, for example, the target region is set as the region 182c including the beginning of the page as in the change example 180a. However, when a return is made to a previous page by a paging operation, the target region may be set as a region including an end of the page, for example. The target region may be thus determined flexibly in consideration of the continuity of the description contents. When the display region is moved from the region 182c to reach the region 184c by a scrolling operation, and thereafter a reducing operation is performed, on the other hand, the target region is changed to the region 184c. Therefore, when an enlarging operation is performed again, display is enlarged toward the region 184c. Thus, it is possible to easily realize, on the display screen, a movement of a line of sight which movement can often occur in a case of a real book, for example when a large region other than a certain part being read intensively is once roughly checked while the part is read intensively, and then the intensive reading is continued.

As another example, when the region 184c in the two pages of the double-page spread shown in FIG. 11 includes the beginning of a description unit, the target region is set as the region 184c at a point in time that the description unit is selected by an operation of display movement in description units. Therefore, though no page change is made by the operation of display movement in description units as described above, the description unit being selected is properly displayed in an enlarged state when enlargement is performed.

Figure 12:
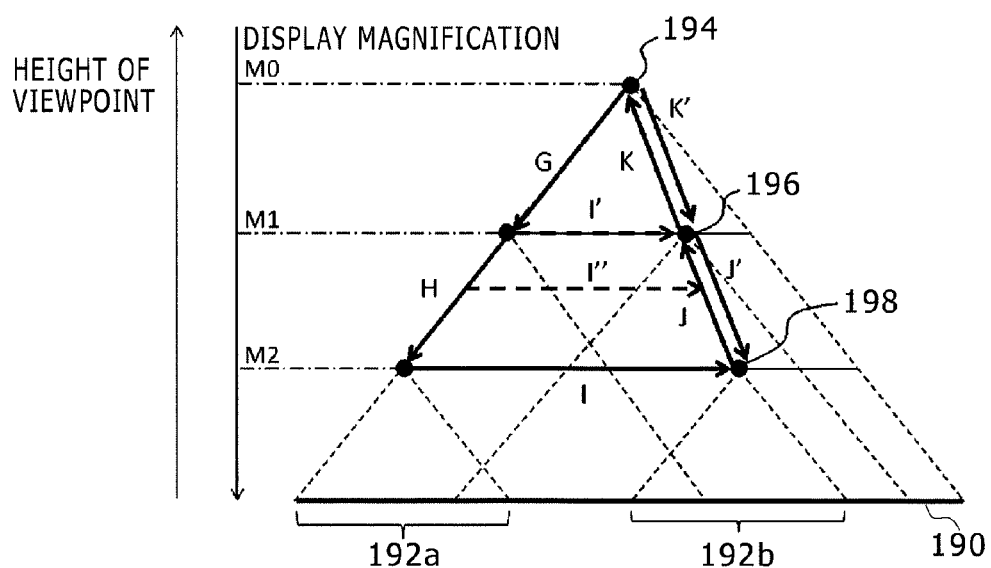
FIG. 12 is a diagram schematically showing relation between changes in the display magnification and a target region in the present embodiment.

FIG. 12 schematically shows relation between changes in the display magnification and the target region. In FIG. 12, an axis of abscissas indicates positions on a page image 190, and an axis of ordinates indicates the height of virtual viewpoints with respect to the page image 190. Typical viewpoints are represented by black circles, and the extents of fields of view obtained from the respective viewpoints are represented by dotted lines. Incidentally, as shown in FIG. 12, the higher the viewpoint, the lower the display magnification. At a viewpoint 194 (minimum magnification M0), the whole of the page image 190 is displayed. Supposing that a target region 192a is set in the page image 190, the viewpoint approaches the target region according to an operation of increasing the display magnification. When the display magnification is changed stepwise, for example, the viewpoint moves intermittently such that display changes from a minimum magnification M0 to an intermediate magnification M1 to a maximum magnification M2 (arrows G and H). When a stepless change is made, the viewpoint continuously moves on the arrows G and H.

When an operation of decreasing the display magnification is performed after the viewpoint is moved by a scrolling operation in the state of the maximum magnification M2 (arrow I), a display region 192b when the operation is performed is set as the target region, and the viewpoint is returned toward the viewpoint 194. When the display magnification is changed stepwise, for example, the viewpoint moves intermittently such that display changes from the maximum magnification M2 to the intermediate magnification M1 to the minimum magnification M0 (arrows J and K). When a stepless change is made, the viewpoint continuously moves on the arrows J and K.

When an operation of increasing the display magnification is thereafter performed again, the viewpoint moves so as to approach the target region 192b (arrows K' and J'). Incidentally, at a time of an operation of changing the display magnification in a stepless manner, the viewpoint can also be stopped at a height other than the heights shown in FIG. 12. In addition, when an operation of decreasing the display magnification is performed after a scrolling operation is performed at the magnification M1 (dotted line arrow I') or at another display magnification (dotted line arrow I"), the target region may be similarly changed to the display region 192b. In this case, the display region when the operation of decreasing the display magnification is performed is a wider range than the region 192b. However, by setting the target region as the display region 192b, enlargement to the maximum magnification M2 can be permitted when an operation of increasing the display magnification is performed again.

As shown in FIG. 12, the target region 192b at this time is obtained as a region viewed from a viewpoint 198 at which the maximum magnification M2 is obtained on an extension of a straight line connecting the viewpoint 194 to a viewpoint when the operation of decreasing the display magnification is performed (for example a viewpoint 196). Incidentally, FIG. 12 shows the page image 190 one-dimensionally, and shows the virtual viewpoints in a two-dimensional space. In actuality, however, the movements of a viewpoint within a three-dimensional space with respect to a two-dimensional page image 190 are calculated.

Figure 13:
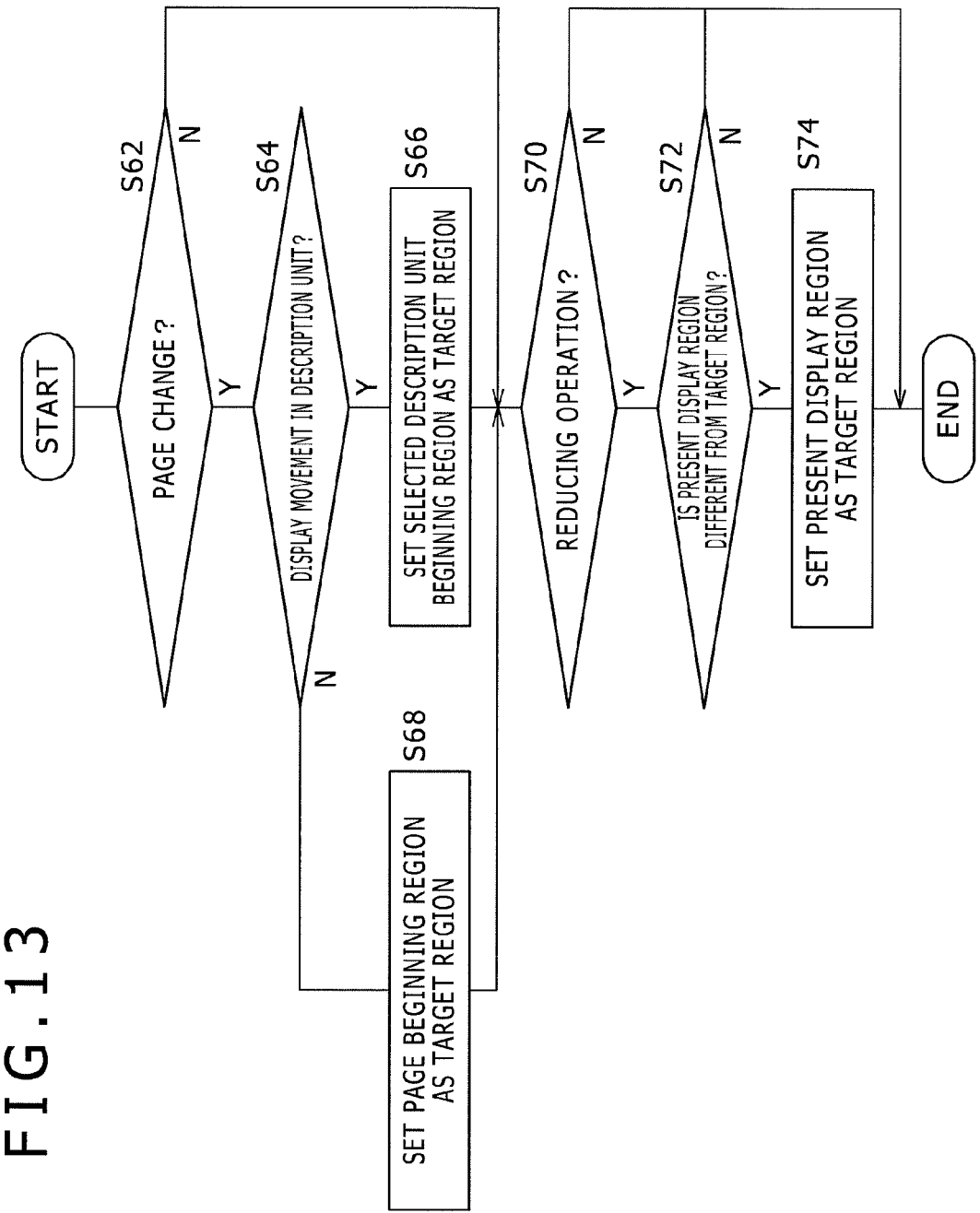
FIG. 13 is a flowchart of a processing procedure for setting the target region in the present embodiment.

These configurations can realize a unique mode in which even when an enlarging operation is performed in the same manner from the same display image at the viewpoint 194, an enlarged region is changed according to conditions. Description will next be made of the operation of the information processing device 10 which operation can be realized by the above constitution. FIG. 13 is a flowchart of a processing procedure for setting the target region, which processing procedure is performed mainly by the display region control unit 116 of the information processing device 10. This setting processing is performed as needed according to user operation. However, suppose that page changing processing, scrolling processing, display magnification changing processing, and the like are performed according to user operation in parallel with the setting processing.

First, when the user operation is a page changing operation (Y in S62), and the page changing operation is an operation of display movement in description units (Y in S64), a region including the beginning of a description unit after the movement, that is, a selected description unit is set as the target region (S66). When the page changing operation is not an operation of display movement in description units (N in S64), a region including the beginning of a page after a change is set as the target region (S68). However, as described above, a region other than a beginning part may be set as the target region by a further criterion for determination according to whether the page is advanced or returned, for example.

When the user operation is an operation of reducing a page image being displayed (N in S62 and Y in S70), on the other hand, and the display region at the point in time is different from the target region due to a scrolling operation thus far or the like (Y in S72), the display region is set as a new target region (S74). When the display region and the target region are the same, the target region is not changed (N in S72). When the user operation is neither a page changing operation nor a reducing operation, the target region is not updated (N in S62 and N in S70). By thus updating the target region as needed, a region enlarged at a time of enlarging processing to be performed separately is changed appropriately.

According to the present embodiment described above, when contents including the data of a plurality of pages of an electronic book or the like are displayed, operations are received which operations include an operation of paging in order, an operation of moving display in description units such as chapters, articles, and the like, and an operation of moving display to an arbitrary page. It is thereby possible to reach a page desired to be displayed by the user efficiently. When display is moved in description units or display is moved to an arbitrary page, in particular, a slide bar that represents all pages of a book by a bar is displayed, and a page being displayed and pages including the beginnings of description units are made recognizable as positions on the bar.

Therefore, a degree of movement that results in the appearance of a desired page can be estimated with a similar feeling to guessing a position at which to open a real book from the thickness of the book. In addition, display movement in description units makes it possible to roughly grasp the whole of the book while checking actual description contents or headings, and start to read a page that attracts interest. Further, a page displayed at a point in time that the slide bar is displayed is marked on the slide bar to allow a return to be made to the original page by a display movement in description units. It is thereby possible to realize, on the display screen, a situation such that a finger is inserted between pages in a process of being read, another page is referenced, and then a return is made to the original pages between which the finger is inserted, in a case of a real book.

Further, an operation of changing the magnification continuously in a stepless manner and an operation of changing to each predetermined magnification stepwise are received as operations of changing the display magnification. Set as predetermined magnifications corresponding to respective steps are not only a minimum magnification at which the whole of a page is displayed and a maximum magnification from which the magnification is not assumed to be increased but also an intermediate magnification in consideration of the layout of the book, readability, and the like. This can reduce the trouble of the user to make fine adjustments of the display magnification until appropriate display is obtained or temporarily scroll a part that has been unintentionally moved off the screen to the inside of the screen.

At a time of a stepwise change in the display magnification, in particular, the display magnification is changed by one step in response to one unit of simple operation such as flicking the joystick, depressing a button, flicking on the touch pad, or the like. In this case, a separate operation is necessary to specify a region to be enlarged, so that operations tend to become complicated. Accordingly, the target region to be enlarged is set appropriately on the side of the information processing device according to conditions. This enables an appropriate region to be enlarged by an easy operation. The target region is similarly set also for an operation of changing the magnification in a stepless manner, whereby operations become easy.

In addition, the operating means used for both operations are integrated into one joystick, and which of the operations is performed is determined according to a temporal change in the amount of tilting of the joystick. Thus, an inconvenience of being unable to remember operations even though the operations are similar because the operating means are dispersed is less likely to occur.

The present disclosure has been described above on the basis of embodiments thereof. The foregoing embodiments are illustrative, and it is to be understood by those skilled in the art that combinations of constituent elements and processing processes of the embodiments are susceptible of various modifications and that such modifications also fall within the scope of the present disclosure.

The present disclosure contains subject matter related to that disclosed in Japanese Priority Patent Application JP 2014-058731 filed in the Japan Patent Office on Mar. 20, 2014, the entire content of which is hereby incorporated by reference.

What is claimed is:

1. An information processing device for displaying contents formed by a plurality of pages according to user operation, the information processing device comprising:
   an operation receiving section receiving an operation of changing a page as an object of display in a state in which a slide bar is in a non-display state and only pages are displayed; and
   a display image control section displaying the slide bar displaying a handle indicating a position of the page being displayed on a bar representing the pages of a whole of the contents as a graphical user interface on a display device together with an image of the page being displayed,
   wherein when the operation receiving section receives a user operation of sliding the handle on the slide bar, the display image control section changes display to a page corresponding to a reached position of the handle, and
   when the operation receiving section receives a user operation on predetermined operating means of an input device while the slide bar is displayed, the display image control section changes display to a page serving as a predetermined break in the contents, wherein, after the user operation on predetermined operating means is received, the display control section adds a marker to the slide bar indicating a starting location, wherein the display image control section stops the display of the slide bar when the operation receiving section receives a user operation of setting the slide bar in the non-display state, and wherein the operation receiving section receives an operation of changing the page as the object of display in order of the pages in a period in which the slide bar is in the non-display state.

2. The information processing device according to claim 1, wherein the display image control section identifies, as the page serving as the break, a page including a beginning of a description unit formed by dividing the contents by a predetermined rule, shows an index at a position of the page including the beginning of the description unit on the slide bar, and moves the handle to a position of the index of the page when changing display to the page serving as the predetermined break, wherein breaks are shown on the slide bar as markers at predetermined locations along the slide bar.

3. The information processing device according to claim 2, wherein when description units of the contents have a hierarchical structure, the display image control section creates a row of the index for each layer, and displays a plurality of index rows concurrently on the slide bar, wherein each index row is displayed using a different marker type.

4. The information processing device according to claim 2, wherein when description units of the contents have a hierarchical structure, the display image control section creates a row of the index for each layer, and displays a row selected by a user from a plurality of created index rows on the slide bar, wherein makers in each row are spaced according to a length of the index for each layer.

5. The information processing device according to claim 1, wherein the operation receiving section receives a user operation of specifying one of two directions as the user operation for changing display to the page serving as the predetermined break, and the display image control section changes display to the page serving as the break present next to the page being displayed in the specified direction on the slide bar.

6. The information processing device according to claim 5, wherein the operation receiving section receives user operations on the same operating means of the input device as an operation for changing display to the page serving as the predetermined break and the operation of changing the page as the object of display in order of the pages, and the display image control section determines which of the operations is performed on a basis of whether or not the slide bar is being displayed.

7. An information processing method by an information processing device for displaying contents formed by a plurality of pages according to user operation, the information processing method comprising:

reading out image data of the pages of the contents from a memory;

receiving an operation of changing a page as an object of display in a state in which a slide bar is in a non-display state and only pages are displayed; and displaying an image of the page using the image data on a display device, and displaying the slide bar displaying a handle indicating a position of the page being displayed on a bar representing the pages of a whole of the contents as a graphical user interface on the display device, wherein when a user operation of sliding the handle on the slide bar is received in the receiving the operation, display is changed to a page corresponding to a reached position of the handle in the displaying, and when a user operation on predetermined operating means of an input device is received in the receiving the operation, display is changed to a page serving as a predetermined break in the contents in the displaying, wherein after the user operation on predetermined operating means is received, the display control section adds a marker to the slide bar indicating a starting location before the display is changed, wherein display of the slide bar is stopped when a user operation of setting the slide bar in the non-display state is performed, and wherein the operation of changing the page as the object of display is performed only in a period in which the slide bar is in the non-display state.

8. A non-transitory computer readable recording medium storing a computer program for making a computer display contents formed by a plurality of pages according to user operation, the computer program comprising:

receiving an operation of changing a page as an object of display in a state in which a slide bar is in a non-display state and only pages are displayed; and displaying the slide bar displaying a handle indicating a position of the page being displayed on a bar representing the pages of a whole of the contents as a graphical user interface on a display device together with an image of the page being displayed, wherein when the receiving the operation receives a user operation of sliding the handle on the slide bar, the displaying changes display to a page corresponding to a reached position of the handle, and when the receiving the operation receives a user operation on predetermined operating means of an input device, the displaying changes display to a page serving as a predetermined break in the contents, wherein, after the user operation on predetermined operating means is received, the display control section adds a marker to the slide bar indicating a starting location before the display is changed, wherein display of the slide bar is stopped when a user operation of setting the slide bar in the non-display state is performed, and wherein the operation of changing the page as the object of display is performed only in a period in which the slide bar is in the non-display state.

* * * * *